(12) United States Patent
Hasegawa et al.

(10) Patent No.: US 10,194,634 B2
(45) Date of Patent: Feb. 5, 2019

(54) ANIMAL EXCRETA DISPOSAL SHEET

(71) Applicant: UNICHARM CORPORATION, Ehime (JP)

(72) Inventors: Satoshi Hasegawa, Kanonji (JP); Takeshi Ikegami, Secaucus, NJ (US)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/735,814

(22) PCT Filed: Aug. 22, 2016

(86) PCT No.: PCT/JP2016/074389
§ 371 (c)(1),
(2) Date: Dec. 12, 2017

(87) PCT Pub. No.: WO2017/110135
PCT Pub. Date: Jun. 29, 2017

(65) Prior Publication Data
US 2018/0317445 A1 Nov. 8, 2018

(30) Foreign Application Priority Data

Dec. 21, 2015 (JP) ................................. 2015-248906

(51) Int. Cl.
*A01K 1/015* (2006.01)
*B32B 5/02* (2006.01)
(Continued)

(52) U.S. Cl.
CPC ............. *A01K 1/0157* (2013.01); *B32B 3/04* (2013.01); *B32B 5/022* (2013.01); *B32B 5/16* (2013.01);
(Continued)

(58) Field of Classification Search
CPC .............................. A01K 1/0157; A01K 1/015
See application file for complete search history.

(56) References Cited

U.S. PATENT DOCUMENTS 7,654,227 B1 * 2/2010 Yananton ............. A01K 1/0107
119/169
2005/0153123 A1 * 7/2005 Herfert ............. A61F 13/15203
428/327
(Continued)

FOREIGN PATENT DOCUMENTS

JP 2005-323548 A 11/2005
JP 2010-51261 A 3/2010
(Continued)

OTHER PUBLICATIONS

International Search Report in PCT/JP2016/074389, dated Nov. 22, 2016, 4 pp.

*Primary Examiner* — Monica L Williams
(74) *Attorney, Agent, or Firm* — Hauptman Ham, LLP

(57) ABSTRACT

An absorbent member of animal excreta disposal sheet includes a first absorbent core containing at least hydrophilic fibers and a second absorbent core composed of a plurality of highly absorbent polymer particles. The plurality of highly absorbent polymer particles includes a large-diameter particle group having a plurality of large-diameter highly absorbent polymer particles, and a small-diameter particle group having a plurality of small-diameter highly absorbent polymer particles. The mass proportions of the large-diameter particle group and the small-diameter particle group are each 15-60 mass %, and the total mass proportion of the large-diameter particle group and the small-diameter particle group is at least 50 mass %.

6 Claims, 5 Drawing Sheets

(51) Int. Cl.
  *B32B 5/16* (2006.01)
  *B32B 21/02* (2006.01)
  *B32B 21/06* (2006.01)
  *B32B 21/12* (2006.01)
  *B32B 27/08* (2006.01)
  *B32B 27/10* (2006.01)
  *B32B 27/32* (2006.01)
  *B32B 29/02* (2006.01)
  *B32B 29/04* (2006.01)
  *B32B 5/26* (2006.01)
  *B32B 5/30* (2006.01)
  *B32B 7/12* (2006.01)
  *B32B 3/04* (2006.01)

(52) U.S. Cl.
  CPC .................. *B32B 5/26* (2013.01); *B32B 5/30* (2013.01); *B32B 7/12* (2013.01); *B32B 21/02* (2013.01); *B32B 21/06* (2013.01); *B32B 21/12* (2013.01); *B32B 27/08* (2013.01); *B32B 27/10* (2013.01); *B32B 27/32* (2013.01); *B32B 29/02* (2013.01); *B32B 29/04* (2013.01); *B32B 2264/02* (2013.01); *B32B 2307/728* (2013.01); *B32B 2307/7265* (2013.01)

(56) References Cited

U.S. PATENT DOCUMENTS

| 2011/0146581 | A1 | 6/2011 | Sasano et al. |
| 2013/0123727 | A1* | 5/2013 | Ichihara .................. A61F 13/42 604/361 |
| 2014/0137805 | A1* | 5/2014 | Sasano .................. A01K 1/0107 119/161 |
| 2015/0150212 | A1 | 6/2015 | Takagi et al. |
| 2015/0223999 | A1* | 8/2015 | Goda ...................... A61F 13/53 604/367 |
| 2016/0338313 | A1 | 11/2016 | Hasegawa et al. |
| 2017/0013799 | A1* | 1/2017 | Bolton .................. A01K 1/0157 |

FOREIGN PATENT DOCUMENTS

| JP | 2014-14304 A | 1/2014 |
| JP | 2015-112073 A | 6/2015 |

* cited by examiner

ANIMAL EXCRETA DISPOSAL SHEET

TECHNICAL FIELD

The present invention relates to an excreta treatment sheet for animals to be used when rearing animals, such as dogs.

BACKGROUND ART

As excreta treatment sheets for animals, for treatment of excreta that have been excreted by pets such as dogs, there are known excreta treatment sheets for animals comprising a liquid-permeable top sheet, a liquid-impermeable back sheet, and an absorbent body disposed between the sheets.

Among these, there are known excreta treatment sheets for animals that can reduce diffusion of excreta absorbed into the absorbent body in the in-plane direction of the sheet. As an example of such an excreta treatment sheet for animals, PTL 1 proposes a pet sheet comprising a liquid-permeable top sheet, a liquid-impermeable back sheet and an absorbent body disposed between the sheets, wherein the absorbent body has a first absorbing layer formed of hydrophilic fibers including a cationic surfactant, and a second absorbing layer formed of a water-absorbent resin, disposed more toward the top sheet side than the first absorbing layer.

The pet sheet disclosed in PTL 1 can maintain the desired hydrophobic state of the hydrophilic fibers for prolonged periods without excreta causing detachment of the cationic surfactant, which is imparting hydrophobicity to the hydrophilic fibers, from the hydrophilic fibers, and it is thus possible to minimize excreta that has been absorbed in the absorbing layer from spreading (diffusing) in the absorbing layer.

CITATION LIST

Patent Literature

[PTL 1] Japanese Unexamined Patent Publication No. 2014-14304

SUMMARY OF INVENTION

Technical Problem

In the pet sheet disclosed in PTL 1, the water-absorbent resin forming the second absorbing layer of the absorbent body is an aggregate of water-absorbent resin particles having one type of particle size exhibiting a single peak in the particle size distribution.

When the aggregates of water-absorbent resin particles have large particle sizes for the water-absorbent resin particles, the total surface area of the particle aggregates is smaller than aggregates of particles with small particle sizes and the moisture absorption speed is relatively slower, and therefore most of the excreta that have permeated the top sheet are absorbed in the first absorbing layer without being absorbed by the second absorbing layer, often making it impossible to rapidly absorb excreta. In addition, the excreta that has reached the first absorbing layer often diffuse in the in-plane direction of the first absorbing layer due to the hydrophilic fibers that have been rendered hydrophobic inside the first absorbing layer.

Conversely, when the aggregates of the water-absorbent resin particles have small particle sizes for the water-absorbent resin particles, the total surface area of the particle aggregates is larger than aggregates of particles with large particle sizes and the moisture absorption speed is faster, and therefore most of the excreta that have permeated the top sheet are rapidly absorbed in the second absorbing layer; however, the water-absorbent resin particles that have absorbed excreta in the second absorbing layer adhere together and cause blocking, and as a result subsequent excreta that have permeated the top sheet often diffuse at the surface of the second absorbing layer due to the blocking.

It is therefore an object of the present invention to provide an excreta treatment sheet for animals that can rapidly absorb excreta that have been discharged from an animal such as a dog, and that can absorb them without diffusion in the in-plane direction of the sheet.

Solution to Problem

One aspect (aspect 1) of the present invention is an excreta treatment sheet for animals comprising a liquid-permeable top sheet, a liquid-impermeable back sheet and an absorbent body disposed between these sheets, the excreta treatment sheet for animals having a specific structure wherein the absorbent body has a first absorbent core including at least hydrophilic fibers, a second absorbent core disposed between the top sheet and the first absorbent core and composed of a plurality of superabsorbent polymer particles, the plurality of superabsorbent polymer particles including a large particle size particle group comprising a plurality of superabsorbent polymer particles with particle sizes of 355 μm to 500 μm, and a small particle size particle group comprising a plurality of superabsorbent polymer particles with particle sizes of 150 μm to 250 μm, wherein the mass percentages of the large particle size particle group and the small particle size particle group with respect to the mass of the total particles of the plurality of superabsorbent polymer particles are each 15 to 60 mass %, and the total mass percentage of the large particle size particle group and small particle size particle group with respect to the mass of the total particles of the plurality of superabsorbent polymer particles is 50 mass % or greater.

In the excreta treatment sheet for animals of the aspect 1, the second absorbent core of the absorbent body is composed of a plurality of superabsorbent polymer particles that include, in a specific mass percentage, a large particle size particle group comprising a plurality of superabsorbent polymer particles with particle sizes of 355 μm to 500 μm (hereunder also referred to as "plurality of large particle size superabsorbent polymer particles"), and a small particle size particle group comprising a plurality of superabsorbent polymer particles with particle sizes of 150 μm to 250 μm (hereunder also referred to as "plurality of small particle size superabsorbent polymer particles"), and therefore excreta such as urine that have permeated the top sheet can be rapidly absorbed by the plurality of small particle size superabsorbent polymer particles in the second absorbent core, while the presence of the plurality of large particle size superabsorbent polymer particles in the second absorbent core prevents blocking between the small particle size superabsorbent polymer particles and can minimize surface diffusion of excreta in the second absorbent core.

In addition, some of the excreta that have reached the first absorbent core are absorbed by the hydrophilic fibers in the first absorbent core, and then absorbed by being drawn up by the large particle size superabsorbent polymer particles in the second absorbent core, thereby allowing in-plane diffusion of the excreta due to the hydrophilic fibers to be minimized in the first absorbent core.

Therefore, the excreta treatment sheet for animals of aspect 1 can rapidly absorb excreta that have been discharged from an animal such as a dog, and can absorb them without diffusion in the in-plane direction of the sheet.

Moreover, according to another aspect (aspect 2) of the present invention, the excreta treatment sheet for animals according to aspect 1 comprises a hydrophilic sheet between the top sheet and the second absorbent core, the hydrophilic sheet being joined both to the top sheet and to the second absorbent core either via or not via an adhesive layer.

In the excreta treatment sheet for animals of aspect 2, the hydrophilic sheet disposed between the top sheet and the second absorbent core is respectively joined to the top sheet and the second absorbent core, and therefore gaps spreading in the in-plane direction are less likely to form between the top sheet and second absorbent core, and liquid pooling of excreta by such gaps, and surface diffusion in the second absorbent core, are less likely to occur.

Consequently, the excreta treatment sheet for animals of aspect 2 has excellent permeability (absorption rate) for excreta, while also being even less likely to have surface diffusion of excreta in the second absorbent core.

According to yet another aspect (aspect 3) of the present invention, in the excreta treatment sheet for animals of aspect 2, a first adhesive layer is disposed between the top sheet and the hydrophilic sheet and a second adhesive layer is disposed between the hydrophilic sheet and the second absorbent core, the first adhesive layer and the second adhesive layer being disposed so that each arrangement pattern at least partially overlaps in the thickness direction of the excreta treatment sheet for animals.

If the arrangement pattern of the first adhesive layer that joins the top sheet and hydrophilic sheet and the arrangement pattern of the second adhesive layer that joins the hydrophilic sheet and second absorbent core are overlapping in the thickness direction of the excreta treatment sheet for animals, then the overlapping portions will be less likely to have gaps formed spreading in the in-plane direction between the top sheet and the hydrophilic sheet and between the hydrophilic sheet and the second absorbent core, and therefore liquid pooling of excreta between each of the sheets and diffusion in the in-plane direction of the sheets (hereunder also referred to as "in-plane diffusion"), will be less likely to occur.

Consequently, the excreta treatment sheet for animals according to aspect 3 has even more excellent permeability (absorption rate) for excreta, while also being even less likely to have in-plane diffusion of excreta.

According to yet another aspect (aspect 4) of the present invention, in the excreta treatment sheet for animals according to aspect 2 or 3, the hydrophilic sheet is composed of hydrophilic fibers, and the interfiber distance of the hydrophilic fibers in the hydrophilic sheet is less than 150 μm.

Since the hydrophilic sheet in the excreta treatment sheet for animals according to aspect 4 is composed of hydrophilic fibers and has excellent liquid permeability, excreta that have permeated the top sheet easily migrate to the second absorbent core.

In addition, since the interfiber distance of the hydrophilic fibers composing the hydrophilic sheet is smaller than the particle sizes of the superabsorbent polymer particles of the small particle size particle group in the second absorbent core, even if an animal such as a dog steps onto and moves on the excreta treatment sheet for animals of this aspect, the superabsorbent polymer particles of the small particle size particle group in the second absorbent core are less likely to permeate the hydrophilic sheet and be released to the outside. Thus, the excreta treatment sheet for animals according to this aspect is less likely to have change in the aforementioned mass percentage of the large particle size particle group and small particle size particle group, and allows the effect of the excreta treatment sheet for animals according to aspect 2 or 3 to be exhibited more stably and persistently.

According to yet another aspect (aspect 5) of the present invention, in an excreta treatment sheet for animals according to any of aspects 1 to 4, the hydrophilic fibers in the first absorbent core are fluff pulp including a cationic surfactant.

In the excreta treatment sheet for animals according to aspect 5, the hydrophilic fiber in the first absorbent core is fluff pulp including a cationic surfactant, the surfaces of the hydrophilic fibers (i.e. pulp) have a fixed hydrophobicity due to the cationic surfactant, and the structure readily exhibits capillary movement, such that excreta that have permeated through the second absorbent core can more rapidly be drawn into the first absorbent core, while in-plane diffusion within the first absorbent core is less likely to occur.

According to yet another aspect (aspect 6) of the present invention, in the excreta treatment sheet for animals according to any of aspects 1 to 5, the absorbent body includes a core wrap sheet covering at least the first absorbent core and second absorbent core.

In the excreta treatment sheet for animals according to aspect 6, at least the first absorbent core and second absorbent core are covered and integrated by the core wrap sheet, and therefore even if an animal such as a dog has stepped onto and moved on the excreta treatment sheet for animals, gaps spreading in the in-plane direction are less likely to form between the first absorbent core and second absorbent core, and liquid pooling of excreta by such gaps, and in-plane diffusion between the first absorbent core and second absorbent core, are less likely to occur.

Furthermore, when the first absorbent core and second absorbent core in an absorbent body are covered by such a core wrap sheet, it is possible to reduce deformation of the absorbent cores, and therefore the absorbent body can exhibit more stable absorption performance.

Consequently, the excreta treatment sheet for animals according to aspect 6 can better prevent in-plane diffusion of excreta, and can more stably exhibit absorption performance such as permeability (absorption rate) of excreta.

Advantageous Effects of Invention

According to the present invention it is possible to provide an excreta treatment sheet for animals that can rapidly absorb excreta such as urine that have been discharged from an animal such as a dog, and that can absorb them without diffusion in the in-plane direction of the sheet.

DESCRIPTION OF EMBODIMENTS

Preferred embodiments of the animal litter of the excreta treatment sheet for animals according to the present invention will now be described in detail with reference to the accompanying drawings. Throughout the present description, unless otherwise specified, the concept of "an object (for example, an excreta treatment sheet for animals, a top sheet or an absorbent body) situated on the horizontal plane in the spread open state with the excreta supply surface facing upward, being viewed in the thickness direction of the object from the top side in the vertical direction" will be referred to simply by the phrase "in the planar view", and a drawing in the planar view will be referred to as a "plan view".

Also throughout the present description, "widthwise direction W" refers to the "short direction of a longitudinal object in the planar view", "lengthwise direction L" refers to the "long direction of a longitudinal object in the planar view", "thickness direction T" refers to the "thickness direction of an object situated on the horizontal plane in the spread out state", and the widthwise direction W, lengthwise direction L and thickness direction T are in a mutually perpendicular relationship.

Also throughout the present description, "the side relatively near the excreta supply surface in the thickness direction T of the excreta treatment sheet for animals" will be referred to as the "supply surface side", and the "side relatively away from the excreta supply surface in the thickness direction T of the excreta treatment sheet for animals" (or the side relatively near the mounting surface mentioned below) will be referred to as the "mounting surface side".

Figure 1:
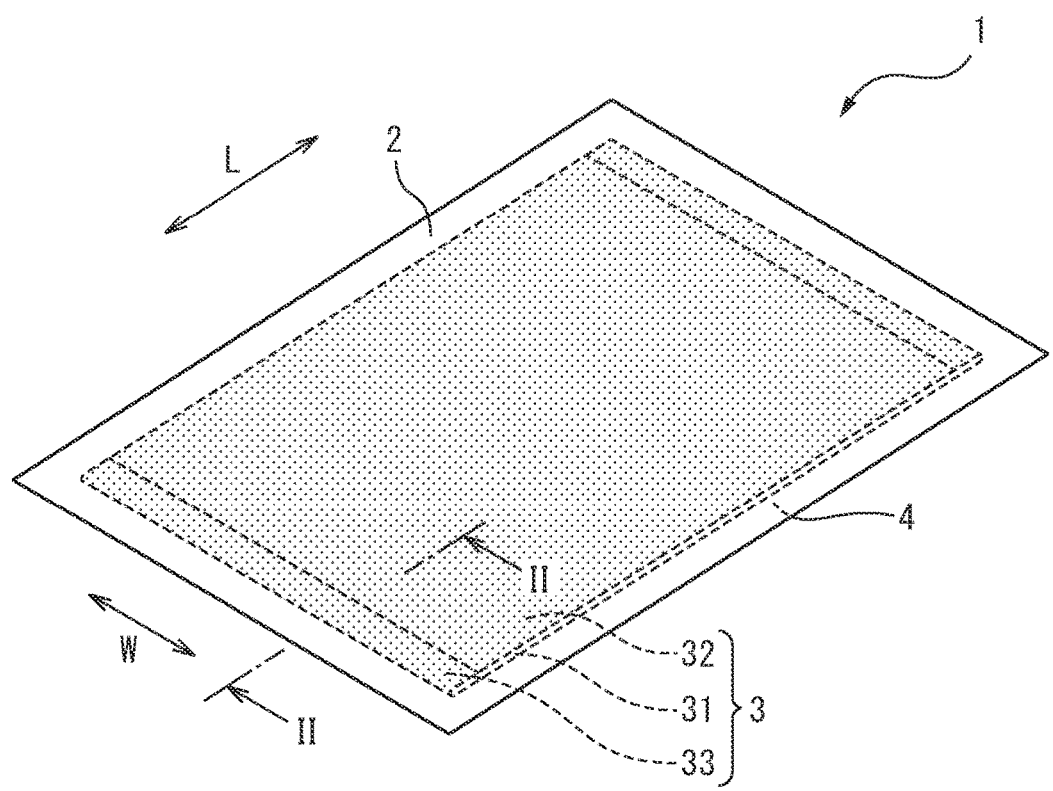
FIG. 1 is a perspective view of an excreta treatment sheet for animals according to one embodiment of the present invention.
Figure 2:
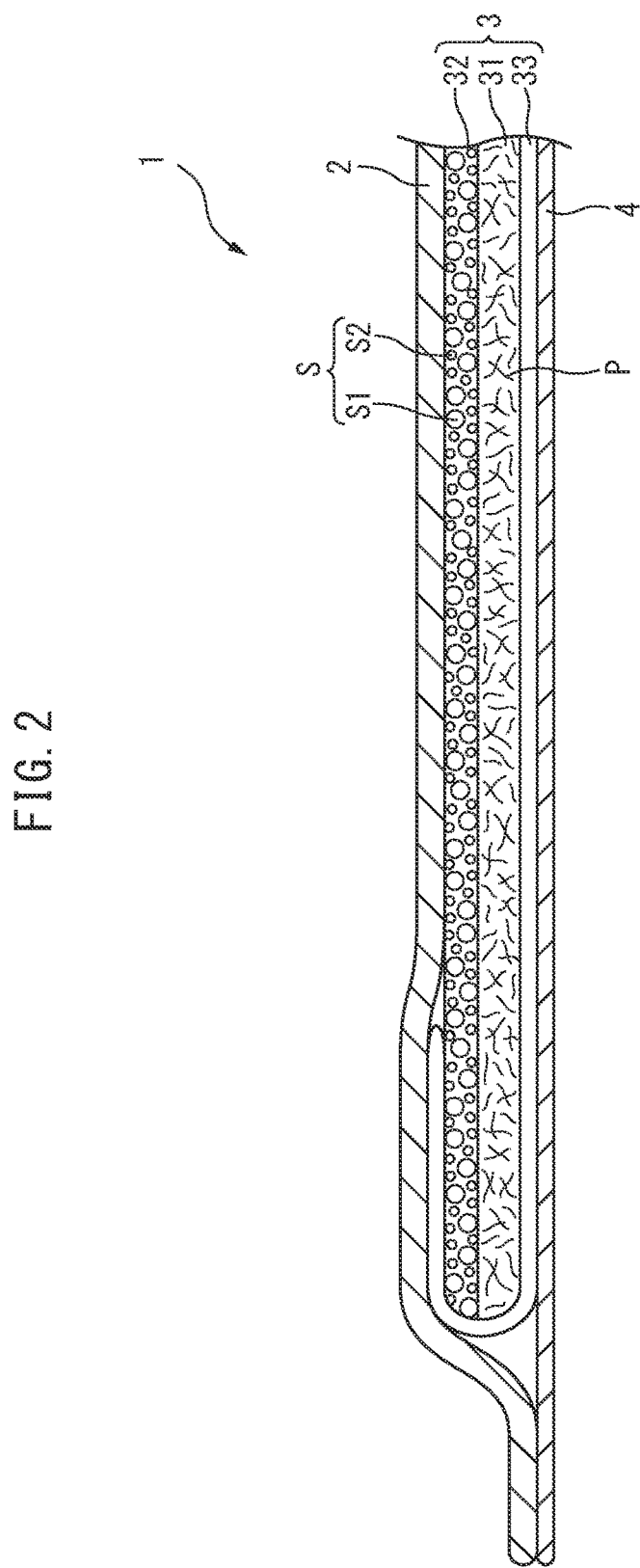
FIG. 2 is a cross-sectional view of an excreta treatment sheet for animals according to one embodiment of the present invention, along line II-II of FIG. 1.

FIG. 1 is a perspective view of an excreta treatment sheet for animals 1 according to one embodiment of the present invention, and FIG. 2 is a cross-sectional view of the excreta treatment sheet for animals 1 along line II-II in FIG. 1.

As shown in FIG. 1, the excreta treatment sheet for animals 1 according to one embodiment of the present invention is a rectangular sheet, in the planar view, having a lengthwise direction L, a widthwise direction W and a thickness direction T. According to the present invention, the outer shape of the excreta treatment sheet for animals is not limited to such a rectangular shape, and any desired shape such as square, polygonal, circular or elliptical may be employed, depending on the purpose of use, design, etc. Furthermore, the size of the excreta treatment sheet for animals 1 may be set as appropriate depending on the size and type of animal to which the excreta treatment sheet is to be applied, and when the animal is a dog, for example, the length in the lengthwise direction L is about 400 mm to 1200 mm and the length in the widthwise direction W is about 250 mm to 800 mm.

As shown in FIG. 1, the excreta treatment sheet for animals 1 is set at a prescribed location of a rearing space for a pet (for example, indoors) in the spread out state, so that the top sheet described below is situated on the excreta supply surface side, and used to absorb and hold excreta, such as urine, that have been discharged from an animal, in order to keep the rearing space in a clean condition. Incidentally, the excreta treatment sheet for animals 1 may be set directly on the floor surface or ground of the rearing space, or it may be set via a prescribed holder, tray, mat or the like.

The "animal" to which the excreta treatment sheet for animals according to the present invention is to be applied is not particularly restricted so long as it is an animal that can be reared, such as a pet, and it may be a mammal such as a dog, cat or hamster, or any of various other types of animals such as a bird, reptile or amphibian.

According to the present invention, the "excreta" to be absorbed and held by the excreta treatment sheet for animals are not particularly restricted so long as they can be absorbed and held in the absorbent body described below, and for example, they may be various types of liquid to low-viscosity body fluids such as feces or urine, mouth excretions such as saliva, or blood.

As shown in FIG. 1 and FIG. 2, the excreta treatment sheet for animals 1 according to this embodiment comprises, in the thickness direction T, a liquid-permeable top sheet 2 forming the supply surface for excreta that have been discharged from an animal, a liquid-impermeable back sheet 4 forming the mounting surface of the excreta treatment sheet for animals 1, which is the surface on the opposite side from the excreta supply surface, (i.e., the surface facing the floor surface or ground on which the excreta treatment sheet for animals has been set), and a liquid-absorbing absorbent body 3 disposed between these sheets, the top sheet 2 and the back sheet 4 being mutually joined by any desired joining means such as a hot-melt adhesive around their respective perimeters.

Each of the members composing the excreta treatment sheet for animals 1 of this embodiment will now be described in detail.

[Top Sheet]

As shown in FIG. 1 and FIG. 2, the top sheet 2 of this embodiment is composed of a sheet-like member that is disposed at a location in the thickness direction T of the excreta treatment sheet for animals 1 where excreta discharged from an animal are first received (i.e., a location on the supply surface side), and that has a level of liquid permeability allowing excreta discharged from the animal to be moved to the surface on the opposite side from the excreta supply surface (the mounting surface side). According to the present invention, the liquid-permeable sheet-like member that may compose the top sheet is not particularly restricted so long as it has the aforementioned liquid permeability, and any desired nonwoven fabric such as an SMS nonwoven fabric (i.e., a spunbond/meltblown/spunbond layered nonwoven fabric), an air-through nonwoven fabric, a spunbond nonwoven fabric, a point bond nonwoven fabric, or a porous film, may be suitably used. The nonwoven fabric may also be subjected to hydrophilicizing treatment with a surfactant. Among these, from the viewpoint of liquid permeability and strength, it is preferred to use an SMS nonwoven fabric.

When a nonwoven fabric composed of thermoplastic resin fibers (for example, an SMS nonwoven fabric, spunbond nonwoven fabric or the like) is used as the top sheet, the type of thermoplastic resin fibers is not particularly restricted, and for example, they may be fibers made of a known resin, such as an olefin-based resin such as polyethylene (PE) or polypropylene (PP) or a polyester-based resin such as polyethylene terephthalate (PET) or polylactic acid (PLA), such resins being used either alone or two or more different types of resins being used in combination. The structures of fibers made of such thermoplastic resins are not particularly restricted, and for example, composite fibers such as core-sheath fibers, or modified cross-section fibers, solid crimped fibers or the like may be used.

In addition, the thermoplastic resin fibers may be subjected to hydrophilicizing treatment, such as treatment utilizing a surfactant or hydrophilic agent (for example, kneading of a surfactant into the fibers, or coating of a surfactant onto the fiber surfaces), or they may include an optional additive such as a pigment, aromatic, deodorant, antimicrobial agent or microbicide. Such additives may also be used in combinations of two or more different types.

According to the present invention, the basis weight of the nonwoven fabric that may compose the top sheet is not particularly restricted so long as it does not inhibit the aforementioned liquid permeability, and it is 6 g/m$^2$ to 30/m$^2$, for example. If the basis weight is within this range it will have the prescribed strength as a top sheet, and will therefore be resistant to tearing when an animal such as a dog steps onto the excreta treatment sheet for animals, and since the interfiber distance between the fibers composing the top sheet are within the prescribed range, it will more easily exhibit capillary movement whereby excreta migrate from the supply surface side to the mounting surface side of the top sheet. An additional advantage is that excreta that have permeated the top sheet and been absorbed and held in the absorbent body will be less visible due to compaction of the fibers of the top sheet.

[Absorbent Body]

As shown in FIG. 2, the absorbent body 3 of this embodiment is an absorbing member that is disposed on the side of the top sheet 2 opposite the supply surface side (i.e., the mounting surface side) and absorbs and holds excreta that have permeated the top sheet 2. The top sheet 2 and the absorbent body 3 are joined by an optional adhesive such as a hot-melt adhesive, the adhesive being disposed between the top sheet 2 and the absorbent body 3 to a basis weight level that does not interfere with permeation of excreta (for example, 0.1 g/m$^2$ to 5 g/m$^2$), and in a coated state (for example, a spiral, dotted or striped form).

For this embodiment, the absorbent body 3 has an essentially rectangular outer shape that is a size smaller than the top sheet 2 and back sheet 4, in the planar view, and is disposed in the center region of the excreta treatment sheet for animals 1; however, according to the present invention there is no limitation to this aspect, and for example, the absorbent body may have any desired planar shape other than rectangular, and it may be disposed at a position shifted in an arbitrary direction from the center of the excreta treatment sheet for animals.

As shown in FIG. 2, the absorbent body 3 is composed of an approximately sheet-like first absorbent core 31 situated on the mounting surface side (i.e. the back sheet side) in the absorbent body 3, and including at least hydrophilic fibers P as an absorbent material to absorb and hold excreta, a second absorbent core 32 situated on the supply surface side (i.e. the top sheet side) in the absorbent body 3, and composed of a plurality of superabsorbent polymer particles S as an absorbent material to absorb and hold excreta, and a core wrap sheet 33 comprising at least one liquid-permeable sheet that covers the first absorbent core 31 and second absorbent core 32 from the mounting surface side (i.e. the back sheet side).

Also, the plurality of superabsorbent polymer particles S composing the second absorbent core 32 include a large particle size particle group comprising a plurality of superabsorbent polymer particles with particle sizes of 355 µm to 500 µm (plurality of large particle size superabsorbent polymer particles S1), and a small particle size particle group comprising a plurality of superabsorbent polymer particles with particle sizes of 150 µm to 250 µm (plurality of small particle size superabsorbent polymer particles S2), and the mass percentages of the large particle size particle group and the small particle size particle group with respect to the mass of the total particles of the plurality of superabsorbent polymer particles S are each in the range of 15 to 60 mass %, while the total mass percentage of the large particle size particle group and small particle size particle group with respect to the mass of the total particles of the plurality of superabsorbent polymer particles S is 50 mass % or greater.

The excreta treatment sheet for animals 1 constructed in this manner has the second absorbent core 32 of the absorbent body 3 composed of a plurality of superabsorbent polymer particles S that include, in a specific mass percentage, a large particle size particle group comprising a plurality of large particle size superabsorbent polymer particles S1 and a small particle size particle group comprising a plurality of small particle size superabsorbent polymer particles S2, and therefore excreta such as urine that have permeated the top sheet 2 can be rapidly absorbed by the plurality of small particle size superabsorbent polymer particles S2 in the second absorbent core 32, while the presence of the plurality of large particle size superabsorbent polymer particles S1 in the second absorbent core 32 prevents blocking between the small particle size superabsorbent polymer particles S2 and can minimize surface diffusion of excreta in the second absorbent core 32.

In addition, some of the excreta that have permeated the second absorbent core 32 and reached the first absorbent core 31 are absorbed by the hydrophilic fibers P in the first absorbent core 31, and then absorbed by being drawn up by the large particle size superabsorbent polymer particles S1 in the second absorbent core 32, thereby allowing in-plane diffusion of the excreta due to the hydrophilic fibers P in the first absorbent core 31 to be minimized.

Therefore, the excreta treatment sheet for animals 1 according to this embodiment can rapidly absorb excreta that have been discharged from an animal such as a dog, and can absorb them without diffusion in the in-plane direction of the sheet.

Incidentally, if the excreta treatment sheet for animals can rapidly absorb excreta such as urine, then a deodorant effect or concealing effect can be exhibited against the excreta immediately after excretion, and a comfortable rearing environment can be provided for the owner of the animal. In addition, if the excreta treatment sheet for animals can absorb excreta such as urine without diffusion in the in-plane direction of the sheet, then the animal such as a dog will be able to more easily perform excretion multiple times and the legs and fur of the animal will be less likely to be wetted.

Furthermore, if the absorbent body 3 is composed of the aforementioned first absorbent core 31 and second absorbent core 32 as in the excreta treatment sheet for animals 1 of this embodiment, then even if excreta held between the hydrophilic fibers P in the first absorbent core 31 have seeped out by pressure from the legs of an animal such as a dog when the animal has stepped onto the excreta treatment sheet for animals 1, the seeped out excreta can be absorbed by the plurality of superabsorbent polymer particles S in the second absorbent core 32 located on the supply surface side of the first absorbent core 31 (especially the plurality of large particle size superabsorbent polymer particles S1), and therefore rewetting of the excreta toward the supply surface of the top sheet 2 will be less likely to occur. As a result, it is possible to prevent fouling of the legs of the animal and generation of bad odor by excreta that have returned from the absorbent body 3.

The mechanism of absorption of urine by sheets, for an excreta treatment sheet for animals wherein the second absorbent core of the absorbent body is composed entirely of a large particle size particle group comprising a plurality of large particle size superabsorbent polymer particles, and wherein the second absorbent core of the absorbent body is composed entirely of a small particle size particle group comprising a plurality of small particle size superabsorbent polymer particles, as comparative forms of the excreta treatment sheet for animals of the present invention, will now be explained with reference to the accompanying drawings.

Figure 3:
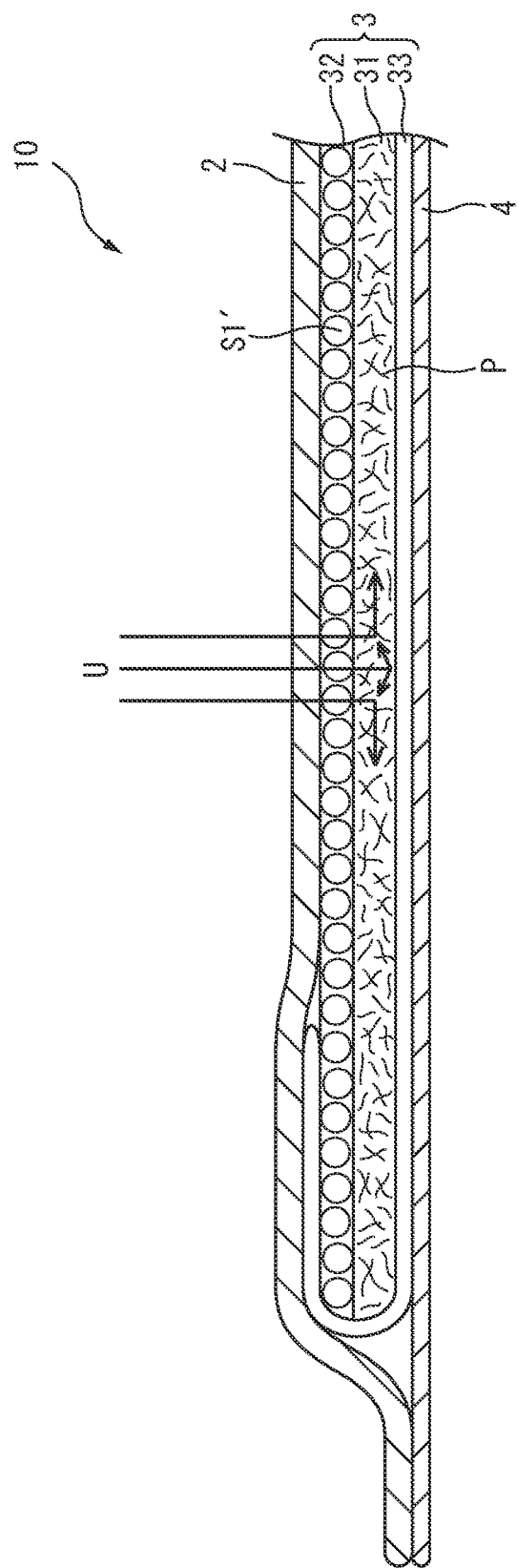
FIG. 3 is a cross-sectional view corresponding to FIG. 2, schematically showing an aspect of absorption of urine by an excreta treatment sheet for animals in which the plurality of superabsorbent polymer particles composing the second absorbent core consist entirely of a large particle size particle group.
Figure 4:
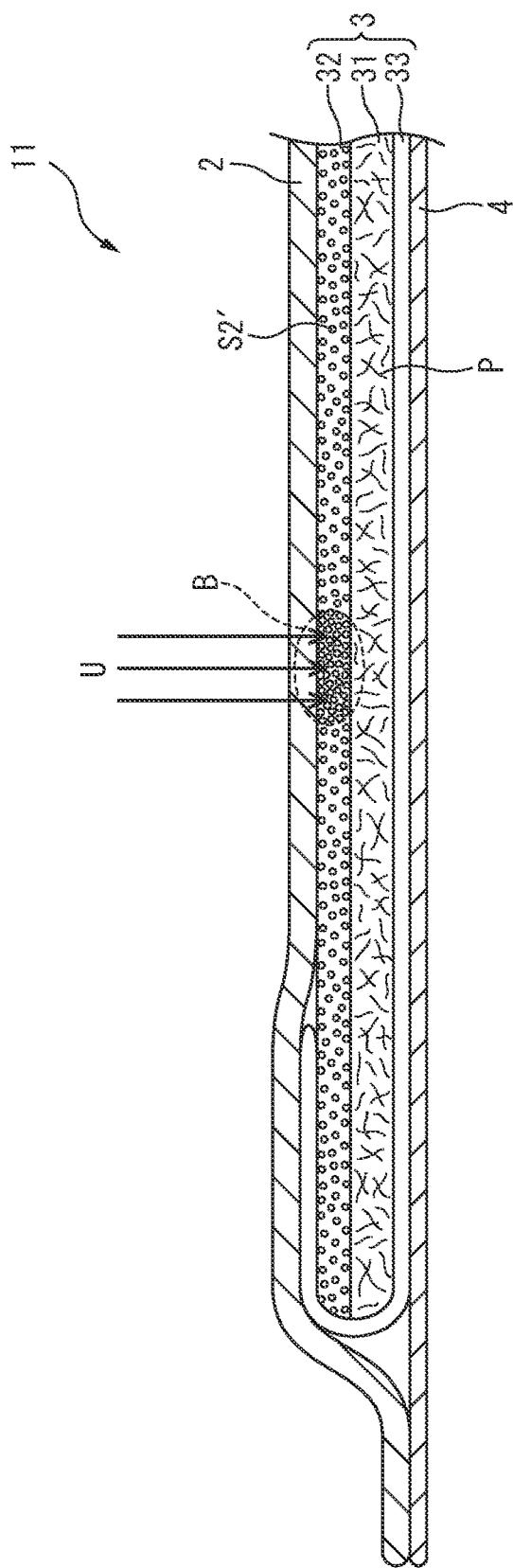
FIG. 4 is a cross-sectional view corresponding to FIG. 2, schematically showing an aspect of absorption of urine by an excreta treatment sheet for animals in which the plurality of superabsorbent polymer particles composing the second absorbent core consist entirely of a small particle size particle group.

FIG. 3 is a cross-sectional view corresponding to FIG. 2, schematically showing an aspect wherein urine is absorbed by an excreta treatment sheet for animals wherein the plurality of superabsorbent polymer particles composing the second absorbent core consist entirely of a large particle size particle group, and FIG. 4 is a cross-sectional view corresponding to FIG. 2, schematically showing an aspect wherein urine is absorbed by an excreta treatment sheet for animals wherein the plurality of superabsorbent polymer particles composing the second absorbent core consist entirely of a small particle size particle group. In the excreta treatment sheets for animals 10, 11 shown in FIG. 3 and FIG. 4, the members that are the same as the excreta treatment sheet for animals 1 shown in FIG. 1 and FIG. 2 are assigned the same reference numerals as in FIG. 1 and FIG. 2.

In the excreta treatment sheet for animals 10 shown in FIG. 3, the plurality of superabsorbent polymer particles S1' composing the second absorbent core 32 consist entirely of a large particle size particle group, the large particle size particle group having relatively small total surface area as a particle group (a particle aggregate) and the moisture absorption speed being slow, and therefore most of the urine U that has permeated the top sheet 2 is absorbed in the first absorbent core 31 without being absorbed at the second absorbent core 32, and from the viewpoint of the period immediately after excretion, it is absorbed at timing that cannot be considered rapid. In addition, as shown in FIG. 3, although the urine U that has permeated the second absorbent core 32 and reached the first absorbent core 31 is absorbed by the hydrophilic fibers P in the first absorbent core 31, it readily diffuses in the in-plane direction in the first absorbent core 31 by the hydrophilic fibers P.

Furthermore, in the excreta treatment sheet for animals 11 shown in FIG. 4, the plurality of superabsorbent polymer particles S2' composing the second absorbent core 32 consist entirely of a small particle size particle group, the small particle size particle group having relatively large total surface area as a particle group (a particle aggregate) and a high moisture absorption speed, and therefore most of the urine U that has permeated the top sheet 2 is rapidly absorbed at the small particle size particle group of the second absorbent core 32; however, at the second absorbent core 32, the superabsorbent polymer particles S2' that have absorbed urine U adhere together and produce blocking B, after which urine U that has permeated the top sheet 2 readily diffuses at the surface of the second absorbent core 32 by the blocking B.

Each of the members composing the absorbent body of the excreta treatment sheet for animals of the present invention will now be described in detail.

(First Absorbent Core)

According to the present invention, the first absorbent core is composed of an absorbent material that includes at least hydrophilic fibers. The hydrophilic fibers in the first absorbent core are not particularly restricted so long as they can absorb and hold liquid, and for example, pulp such as wood pulp derived from broadleaf trees or conifers, or grassy plants pulp; cellulosic hydrophilic fibers including regenerated fibers such as rayon, may be used. Fluff pulp having long fiber lengths are preferred among these. The basis weight of the hydrophilic fibers in the first absorbent core is also not particularly restricted, but from the viewpoint of liquid absorption it is preferably in the range of 30 $g/m^2$ to 250 $g/m^2$.

In the excreta treatment sheet for animals according to the present invention, it is especially preferred to use fluff pulp including a cationic surfactant, as the hydrophilic fibers in the first absorbent core. Such fluff pulp including a cationic surfactant has consistent hydrophobicity on the surfaces of the hydrophilic fibers (i.e. pulp) due to the cationic surfactant and readily exhibits capillary movement, and therefore when such fluff pulp is used as hydrophilic fibers in the first absorbent core, excreta that have permeated the second absorbent core can be more rapidly drawn up into the first absorbent core, while the excreta that have been drawn up into the first absorbent core are easily repelled by the hydrophobicity of the hydrophilic fiber surfaces, thereby more effectively reducing in-plane diffusion of the excreta within the first absorbent core.

The cationic surfactant in this case is not particularly restricted, and for example, amine salts, quaternary ammonium salts, benzalkonium salts, benzethonium chloride, pyridinium salts, imidazolium salts, polyamide derivatives and the like may be used. Of these, quaternary ammonium salts are preferred for use since they have antibacterial properties and can thus impart antibacterial properties to the absorbent body.

The first absorbent core may also include other absorbent materials within ranges that do not interfere with the effect of the present invention. Examples of such other absorbent materials include superabsorbent polymers. A superabsorbent polymer is a polymer with particularly excellent water absorbing properties (for example, a polymer with a moisture absorption speed of 10 seconds or less based on the vortex method), and it is a polymer commonly known as "SAP" in the technical field. Such a superabsorbent polymer may be the same superabsorbent polymer as the superabsorbent polymer forming the second absorbent core described below, or it may be a different superabsorbent polymer. When the first absorbent core includes another such absorbent material, the moisture absorption and water capacity of the absorbent body as a whole are increased, and therefore excreta excreted from an animal can be more reliably absorbed and held for prolonged periods.

(Second Absorbent Core)

According to the present invention, as in the embodiment shown in FIG. 2, the second absorbent core is composed of a plurality of superabsorbent polymer particles present in a dispersed planar state throughout the entire surface on the supply surface side of the first absorbent core. As mentioned above, the plurality of superabsorbent polymer particles composing the second absorbent core include a large particle size particle group comprising a plurality of superabsorbent polymer particles with particle sizes of 355 μm to 500 μm (plurality of large particle size superabsorbent polymer particles), and a small particle size particle group comprising a plurality of superabsorbent polymer particles with particle sizes of 150 µm to 250 µm (plurality of small particle size superabsorbent polymer particles), and the mass percentages of the large particle size particle group and the small particle size particle group with respect to the mass of the total particles of the plurality of superabsorbent polymer particles are each in the range of 15 to 60 mass %, while the total mass percentage of the large particle size particle group and small particle size particle group with respect to the mass of the total particles of the plurality of superabsorbent polymer particles is 50 mass % or greater. From the viewpoint of more advantageously obtaining the effect of the present invention (especially the effect of allowing absorption of excreta without diffusion in the in-plane direction of the sheet), the mass percentages of the large particle size particle group and small particle size particle group with respect to the mass of the total particles of the plurality of superabsorbent polymer particles are more preferably in the range of 15 mass % to 40 mass % and 20 mass % to 60 mass %, respectively, and the total mass percentage of the large particle size particle group and small particle size particle group is more preferably in the range of 65 mass % to 75 mass %.

Throughout the present description, the particle sizes of the superabsorbent polymer particles are the sizes of the particles as determined by a sieve screening method, and specifically by the sieve aperture, while the mass percentage can be obtained by using a vibrating sifter comprising a plurality of sieves with different apertures (for example, a Model AS-200 by Retsch) to sift a plurality of particles of prescribed mass (initial mass (g)) for a prescribed time period (for example, 3 minutes), and calculating the mass percentage (%) from the mass (g) of granules in each sieve and the aforementioned initial mass (g). The plurality of sieves with different apertures mentioned above may be a plurality of sieves with respective apertures of 150 µm, 250 µm, 355 µm and 500 µm, for example.

According to the present invention, the superabsorbent polymer composing the second absorbent core is a polymer with particularly excellent water absorbing properties (for example, a polymer with a moisture absorption speed of 10 seconds or less based on the vortex method, known as "SAP" in the technical field); however, the specific composition is not particularly restricted, and any desired superabsorbent polymer such as polyacrylic acid-based, starch-based or cellulosic, for example, may be employed. The basis weight of the superabsorbent polymer composing the second absorbent core is not particularly restricted so long as it does not interfere with the effect of the present invention, but from the viewpoint of liquid absorption, for example, it is preferably in the range of 5 $g/m^2$ to 80 $g/m^2$ and more preferably in the range of 10 $g/m^2$ to 60 $g/m^2$.

For the embodiment described above, the absorbent body 3 is composed of two absorbent cores, the first absorbent core 31 and second absorbent core 32; however, according to the present invention there is no limitation to such a structure, and the absorbent core may be composed of three or more absorbent cores, so long as it includes the aforementioned first absorbent core and second absorbent core. Examples of such a structure include one in which a separate third absorbent core is also disposed on the mounting surface side of the first absorbent core.

(Core Wrap Sheet)

According to the present invention, the core wrap sheet is a liquid-permeable sheet-like member forming the absorbent body together with the first absorbent core and second absorbent core, the core wrap sheet covering the first absorbent core, the second absorbent core and an optional hydrophilic sheet from the mounting surface side (i.e., the back sheet side), and functioning to integrate the absorbent cores and to prevent deformation of each absorbent core, positional shifting of the hydrophilic sheet, and leakage of the superabsorbent polymer particles. According to the present invention, the core wrap sheet is not particularly restricted so long as it is a sheet-like member having liquid permeability, and for example, it may be the same type of tissue paper as the hydrophilic sheet described below (for example, tissue paper with a basis weight of 12 $g/m^2$ to 25 $g/m^2$, formed using Northern bleached Kraft pulp as the main starting material), or any desired nonwoven fabric such as an air-through nonwoven fabric or spunbond nonwoven fabric.

In the excreta treatment sheet for animals 1 according to the embodiment described above, the first absorbent core 31 and second absorbent core 32 are covered and integrated by the core wrap sheet 33, and therefore even if an animal such as a dog has stepped onto and moved on the excreta treatment sheet for animals 1, gaps spreading in the in-plane direction are less likely to form between the first absorbent core 31 and second absorbent core 32, and liquid pooling of excreta by such gaps, and in-plane diffusion between the first absorbent core 31 and second absorbent core 32, are less likely to occur. Furthermore, when the first absorbent core 31 and second absorbent core 32 in the absorbent body 3 are covered by such a core wrap sheet 33, it is possible to reduce deformation of the absorbent cores, and therefore the absorbent body can exhibit more stable absorption performance.

(Hydrophilic Sheet)

Figure 5:
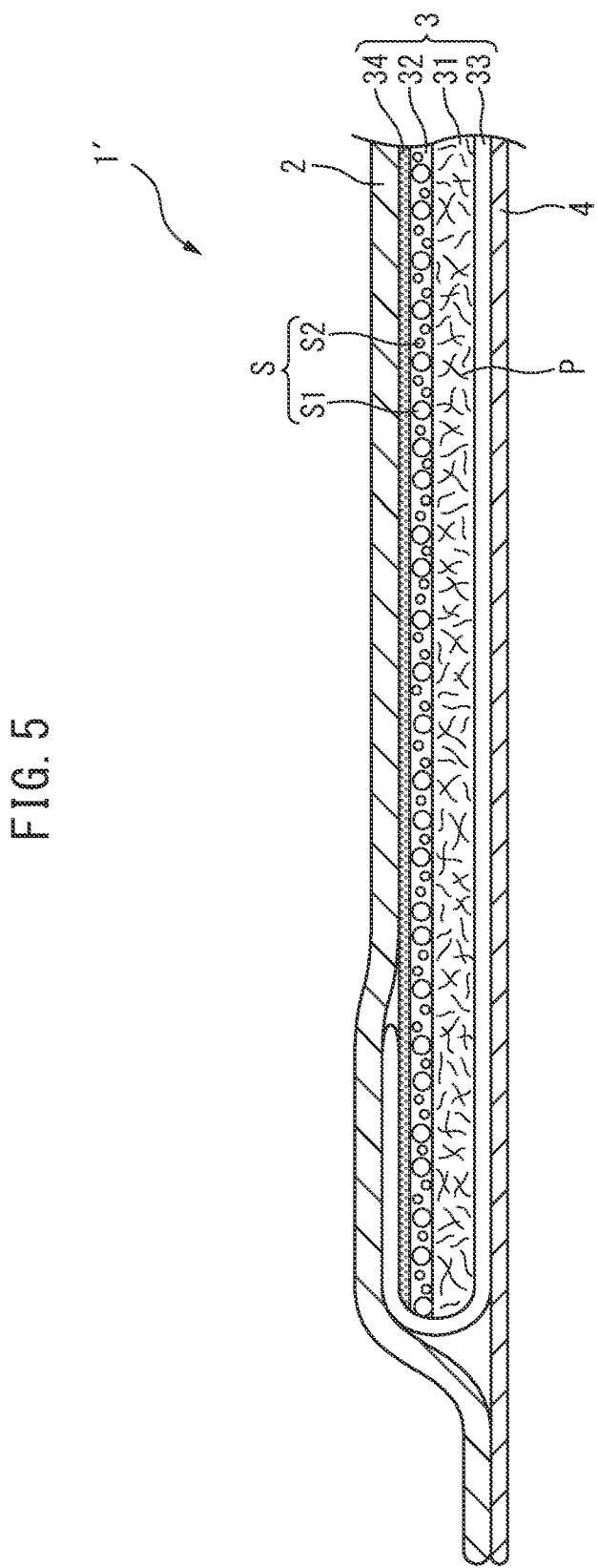
FIG. 5 is a cross-sectional view corresponding to FIG. 2, of an excreta treatment sheet for animals according to another embodiment of the present invention.

The excreta treatment sheet for animals of the present invention may have a hydrophilic sheet disposed between the top sheet and the second absorbent core. FIG. 5 is a cross-sectional view corresponding to FIG. 2, of an excreta treatment sheet for animals 1' according to another embodiment of the present invention.

As shown in FIG. 5, the excreta treatment sheet for animals 1' according to another embodiment of the present invention comprises a hydrophilic sheet 34 between the top sheet 2 and the second absorbent core 32, the hydrophilic sheet 34 being joined both to the top sheet 2 and to the second absorbent core 32 either via or not via an adhesive layer. In the excreta treatment sheet for animals 1' according to this different embodiment, the hydrophilic sheet 34 is disposed between the top sheet 2 and the second absorbent core 32, and the hydrophilic sheet 34 is respectively joined to the top sheet 2 and the second absorbent core 32, and therefore gaps spreading in the in-plane direction are less likely to form between the top sheet 2 and second absorbent core 32, and liquid pooling of excreta by such gaps, and surface diffusion in the second absorbent core 32, are less likely to occur.

Consequently, the excreta treatment sheet for animals 1' has excellent permeability (absorption rate) for excreta, while also being even less likely to have surface diffusion of excreta in the second absorbent core.

Incidentally, as shown in FIG. 5, the hydrophilic sheet 34 may be covered by the core wrap sheet 33 from the mounting surface side, together with the first absorbent core 31 and second absorbent core 32, to form the absorbent body 3, or it may be disposed on the surface of the absorbent body 3 on the supply surface side, which has the first absorbent core 31 and second absorbent core 32 covered by the core wrap sheet 33. In the absorbent body 3, if the hydrophilic sheet 34 is disposed so as to cover the surface of the supply surface side (top sheet side) of the second absorbent core 32, then it can cooperate with the core wrap sheet 33 to minimize deformation of the first absorbent core 31 and second absorbent core 32 or leakage of the superabsorbent polymer particles, thereby allowing the absorption performance as an absorbent body to be more stably exhibited.

The excreta treatment sheet for animals 1' according to the other embodiment described above has a first adhesive layer (not shown) disposed between the top sheet 2 and hydrophilic sheet 34, and a second adhesive layer (not shown) disposed between the hydrophilic sheet 34 and second absorbent core 32, these adhesive layers being disposed so that the arrangement patterns at least partially overlap in the thickness direction T of the excreta treatment sheet for animals 1'. If the arrangement pattern of the first adhesive layer that joins the top sheet 2 and hydrophilic sheet 34 and the arrangement pattern of the second adhesive layer that joins the hydrophilic sheet 34 and second absorbent core 32 are overlapping in the thickness direction T of the excreta treatment sheet for animals 1', then the overlapping portions will be less likely to have gaps formed spreading in the in-plane direction between the top sheet 2 and the hydrophilic sheet 34 and between the hydrophilic sheet 34 and the second absorbent core 32, and therefore liquid pooling of excreta between each of the sheets and in-plane diffusion will be less likely to occur.

According to the present invention, the manner of joining the hydrophilic sheet and second absorbent core is not restricted so long as it is by the aforementioned adhesive, and the hydrophilic sheet and second absorbent core may instead be bonded by a water spray. A water spray is bonding means in which, during production of an absorbent body, water is atomized (sprayed) onto the top surface of a second absorbent core composed of a plurality of superabsorbent polymer particles (i.e., the surface on the supply surface side), and a hydrophilic sheet is attached over it. The sprayed water is then vaporized off to produce a dry state at the water-sprayed sections, and the hydrophilic sheet and second absorbent core thereby become directly joined (i.e., without an intervening adhesive). When a hydrophilic sheet and second absorbent core are bonded by water spraying in this manner, there is no adhesive layer intervening between the hydrophilic sheet and second absorbent core and gaps spreading in the in-plane direction are less likely to form, so that excreta such as urine that have permeated the top sheet can rapidly migrate into the second absorbent core and liquid pooling or in-plane diffusion of the excreta are less likely to take place between the hydrophilic sheet and second absorbent core.

According to the present invention, the hydrophilic sheet disposed between the top sheet and second absorbent core is not particularly restricted so long as it is a hydrophilic sheet with liquid permeability, and for example, it may be a fiber sheet composed of hydrophilic fibers, and more specifically, it may be the same type of tissue paper as the core wrap sheet described above (for example, tissue paper with a basis weight of 12 g/m² to 25 g/m², formed using Northern bleached Kraft pulp as the main starting material), or any desired nonwoven fabric such as an air-through nonwoven fabric or spunbond nonwoven fabric. Furthermore, the hydrophilic sheet may be colored with any desired color such as blue, green, yellow, orange or red. When the hydrophilic sheet disposed between the top sheet and second absorbent core is thus colored, the color of excreta absorbed and held in the first absorbent core and second absorbent core will blend with the color shade of the hydrophilic sheet to become less conspicuous, and therefore excreta held in the absorbent body will be less visible from the top sheet side.

Also, according to the present invention, preferably the hydrophilic sheet disposed between the top sheet and second absorbent core is composed of hydrophilic fibers, the interfiber distance between the hydrophilic fibers of the hydrophilic sheet being less than 150 µm. A hydrophilic sheet with such a construction has excellent liquid permeability and therefore excreta that have permeated the top sheet can rapidly migrate to the second absorbent core. In addition, since the interfiber distance of the hydrophilic fibers composing the hydrophilic sheet is smaller than the particle sizes of the small particle size superabsorbent polymer particles in the second absorbent core, even if an animal such as a dog steps onto and moves on the excreta treatment sheet for animals of this aspect, the small particle size superabsorbent polymer particles in the second absorbent core are less likely to permeate the hydrophilic sheet and be released to the outside. Thus, the excreta treatment sheet for animals comprising the hydrophilic sheet will be less likely to vary in mass percentage between the large particle size particle group and small particle size particle group, and the effect of the present invention (i.e., the effect whereby excreta that have been discharged from an animal such as a dog can be rapidly absorbed, and can be absorbed without diffusing in the in-plane direction of the sheet) can be exhibited more stably and persistently. Various measuring methods for interfiber distance are commonly known, such as mercury porosimetry, and the present description uses the precision level of an interfiber distance that allows particles of a prescribed particle size to pass through; specifically, an "interfiber distance of less than 150 µm" means an interfiber distance such that when a plurality of superabsorbent polymer particles with a particle size of 150 µm are placed on the fiber sheet and the fiber sheet is oscillated, the superabsorbent polymer particles do not pass through.

[Back Sheet]

According to the present invention, the back sheet is a liquid-impermeable sheet-like member that is disposed facing the floor surface or ground on which the excreta treatment sheet for animals is set in the thickness direction T of the excreta treatment sheet for animals, as in the embodiment illustrated in FIG. 2, and it functions to prevent leakage of excreta such as urine that have been discharged from an animal. A liquid-impermeable sheet-like member that can form such a back sheet is not particularly restricted, and for example, a resin film formed from polyethylene, polypropylene, polyethylene terephthalate or the like, a laminate of a nonwoven fabric attached to such a resin film, a laminated resin film obtained by laminating different resin films together (for example, a polyethylene/polypropylene laminated film), or a water-repellent or hydrophobic nonwoven fabric, may be suitably used.

Furthermore, the back sheet, similar to the top sheet described above, is one with a planar shape and dimensions capable of covering the absorbent body, and for the embodiment described above, the top sheet and back sheet have approximately the same rectangular shape and dimensions in the planar view.

The excreta treatment sheet for animals of the present invention can be produced in the following manner, for example.

(1) Production of Absorbent Body

An approximately flat first absorbent core is prepared including at least hydrophilic fibers as the absorbent material, and on one surface of the first absorbent core (i.e., the surface that is to be the supply surface side of the excreta treatment sheet for animals), a plurality of superabsorbent polymer particles including a large particle size particle group composed of a plurality of superabsorbent polymer particles with particle sizes of 355 μm to 500 μm, and a small particle size particle group composed of a plurality of superabsorbent polymer particles with particle sizes of 150 μm to 250 μm, in a prescribed mass percentage and a prescribed total mass percentage, are disposed in a uniform manner to form a second absorbent core, thereby obtaining an absorbent core comprising a laminate of the first absorbent core and second absorbent core. In addition, on the top surface of the absorbent core a liquid-permeable hydrophilic sheet is attached using a hot-melt adhesive, and then the hydrophilic sheet and the absorbent core are covered with a core wrap sheet from the bottom surface side (i.e., the mounting surface side of the excreta treatment sheet for animals), to obtain an absorbent body.

(2) Production of Excreta Treatment Sheet for Animals

On the top surface of the obtained absorbent body (i.e., the surface that is to be the supply surface side of the excreta treatment sheet for animals), a liquid-permeable top sheet is joined using a hot-melt adhesive, while on the bottom side of the absorbent body (i.e., the surface on the mounting surface side of the excreta treatment sheet for animals) there is disposed a liquid-impermeable back sheet, and the perimeters of each of the top sheet and back sheet may be joined using a hot-melt adhesive with the absorbent body sandwiched between the top sheet and the back sheet, to obtain an excreta treatment sheet for animals.

The excreta treatment sheet for animals of the present invention is not restricted to the different embodiments described above or the examples described below, and may incorporate appropriate combinations and modifications in a range that is not outside of the object and gist of the present invention. Incidentally, the ordinal terms "first" and "second" as used throughout the present description serve merely to distinguish between the numbered embodiments and are not used to mean any relative ordering, precedence or importance.

EXAMPLES

The present invention will now be explained in greater detail using examples and comparative examples, with the understanding that the present invention is not limited only to these examples.

Examples 1 to 3 and Comparative Examples 1 to 4

(1) Production of Absorbent Bodies

A plurality of superabsorbent polymer particles including a large particle size particle group composed of a plurality of superabsorbent polymer particles with particle sizes of 355 μm to 500 μm and a small particle size particle group composed of a plurality of superabsorbent polymer particles with particle sizes of 150 μm to 250 μm, in the mass percentages and total mass percentages listed in Table 1 below, were disposed in a uniform manner on the top surface of a first absorbent core composed of fluff pulp with a basis weight of 60 g/m$^2$, to form a second absorbent core, to obtain multiple types of absorbent cores with different mass percentages and total mass percentages of the large particle size particle group and small particle size particle group. On the top surface of each absorbent core obtained in this manner there was attached a hydrophilic sheet composed of tissue paper with a basis weight of 12.5 g/m$^2$, using a hot-melt adhesive, after which the hydrophilic sheet and the absorbent core were covered from the bottom surface side by a core wrap sheet composed of tissue paper with a basis weight of 12.5 g/m$^2$, to prepare absorbent bodies to be used in excreta treatment sheets for animals for Examples 1 to 3 and Comparative Examples 1 to 4.

(2) Production of Excreta Treatment Sheets for Animals

Each of the prepared absorbent bodies had a top sheet made of an SMS nonwoven fabric with a basis weight of 17 g/m$^2$ joined to the top surface of the absorbent body using a hot-melt adhesive, while a polyethylene/polypropylene laminated film was situated as a back sheet on the bottom side of the absorbent body, and the perimeters of the top sheet and back sheet were joined with a hot-melt adhesive to obtain excreta treatment sheets for animals for Examples 1 to 3 and Comparative Examples 1 to 4.

The moisture absorption speeds of each of the plurality of superabsorbent polymer particles used in the second absorbent cores of the excreta treatment sheets for animals of Examples 1 to 3 were measured by a moisture absorption speed measurement method based on the vortex method described below. Also, as a reference example for moisture absorption speed, the moisture absorption speed was also measured in the same manner for a plurality of superabsorbent polymer particles consisting entirely of a large particle size particle group (Reference Example 1) and a plurality of superabsorbent polymer particles consisting entirely of a small particle size particle group (Reference Example 2). The measurement results for the moisture absorption speed are shown in Table 1 below.

[Method of Measuring Moisture Absorption Speed]

1) A 50 g portion of physiological saline was placed in a 100 ml beaker.

2) Using a magnetic stirrer, the stirrer with a diameter of 8 mm and a length of 30 mm was rotated at a rotational speed of 600 rpm to agitate the physiological saline.

3) After loading 2 g of the plurality of superabsorbent polymer particles into the beaker, time measurement was initiated.

4) Agitation was continued while measuring the time (sec) until generation of eddies in the physiological saline ceased, and the time was recorded as the absorption time (moisture absorption speed) (sec).

TABLE 1

| | | Example 1 | Example 2 | Example 3 | Reference Example 1 | Reference Example 2 |
|---|---|---|---|---|---|---|
| Mass percentages of plurality of superabsorbent polymer particles (%) | Large particle size particle group (particle sizes = 355 μm to 500 μm) | 38 | 28 | 18 | 100 | 0 |

TABLE 1-continued

|  |  | Example 1 | Example 2 | Example 3 | Reference Example 1 | Reference Example 2 |
|---|---|---|---|---|---|---|
|  | Small particle size particle group (particle sizes = 150 μm to 250 μm) | 27 | 41 | 54 | 0 | 100 |
|  | Total mass percentage of large particle size particle group and small particle size particle group | 65 | 69 | 72 | 100 | 100 |
| Moisture absorption speed (sec) |  | 5.9 | 3.9 | 3.0 | 39.1 | 2.7 |

The excreta treatment sheets for animals of Examples 1 to 3 and Comparative Examples 1 to 4 obtained as described above were measured for liquid diffusion area (cm²) according to the measurement method described below, to evaluate the diffusibility in the in-plane direction of the excreta treatment sheets for animals. The measurement results for the liquid diffusion area are shown in Table 2 below.

(5) The diffusion length in the first direction and the diffusion length in the second direction that were measured were used to calculate the liquid diffusion area (cm²) by the following formula.

Liquid diffusion area=(diffusion length in first direction/2)×(diffusion length in second direction/2)×3.14

TABLE 2

|  |  | Example 1 | Example 2 | Example 3 | Comp. Example 1 | Comp. Example 2 | Comp. Example 3 | Comp. Example 4 |
|---|---|---|---|---|---|---|---|---|
| Mass percentage of second absorbent core (%) | Large particle size particle group (particle sizes = 355 μm to 500 μm) | 38 | 28 | 18 | 53 | 48 | 8 | 3 |
|  | Small particle size particle group (particle sizes = 150 μm to 250 μm) | 27 | 41 | 54 | 7 | 14 | 68 | 74 |
|  | Total mass percentage of large particle size particle group and small particle size particle group | 65 | 69 | 72 | 60 | 62 | 76 | 77 |
| Liquid diffusion area (cm²) |  | 82 | 82 | 87 | 114 | 109 | 91 | 92 |

[Method of Measuring Liquid Diffusion Area]

(1) A vinyl chloride tube with an outer diameter of 66.6 mm, an inner diameter of 60.2 mm and a height of 53 mm is situated at the measuring location of the excreta treatment sheet for animals to be measured (excluding creased portions).

(2) A burette containing 0.9% physiological saline is inserted in the vinyl chloride tube and anchored at a position 10 mm above the excreta treatment sheet for animals.

(3) A 40 mL portion of the 0.9% physiological saline is dropped from the burette for 6 seconds.

(4) When 5 minutes have elapsed from dropping of the physiological saline, measurement is made of the diffusion length (cm) of the physiological saline in a prescribed first direction and the diffusion length (cm) in a second direction that is perpendicular to the first direction. For measurement of each of the excreta treatment sheets for animals of the examples and comparative examples of the present invention, the first direction was the machine direction (the "MD direction") during production of the excreta treatment sheet for animals, and the second direction was the direction perpendicular to the MD direction (the "CD direction").

The excreta treatment sheets for animals of Examples 1 to 3 of the present invention were all able to rapidly absorb physiological saline used as a model of excreta, and as shown in Table 2, they had small liquid diffusion areas and were able to carry out absorption without diffusion in the in-plane direction of the sheets.

On the other hand, the excreta treatment sheets for animals of Comparative Examples 1 to 4 all had mass percentages outside of the range of 15 to 60 mass % for each of the large particle size particle group and small particle size particle group of the superabsorbent polymers in the second absorbent core, and therefore they had large liquid diffusion areas and were not able to carry out absorption of the excreta model (physiological saline) without diffusion in the in-plane direction of the sheets.

REFERENCE SIGN LIST

1 Excreta treatment sheet for animals
2 Top sheet
3 Absorbent body
31 First absorbent core
32 Second absorbent core 33 Core wrap sheet
34 Hydrophilic sheet
4 Back sheet

The invention claimed is:

1. An excreta treatment sheet for animals comprising a liquid-permeable top sheet, a liquid-impermeable back sheet and an absorbent body disposed between these sheets,
   wherein the absorbent body has a first absorbent core including at least hydrophilic fibers, and a second absorbent core disposed between the top sheet and the first absorbent core and composed of a plurality of superabsorbent polymer particles,
   the plurality of superabsorbent polymer particles including a large particle size particle group comprising a plurality of superabsorbent polymer particles with particle sizes of 355 µm to 500 µm, and a small particle size particle group comprising a plurality of superabsorbent polymer particles with particle sizes of 150 µm to 250 µm,
   wherein mass percentages of the large particle size particle group and the small particle size particle group with respect to mass of total particles of the plurality of superabsorbent polymer particles are each 15 to 60 mass %, and a total of the mass percentages of the large particle size particle group and the small particle size particle group is not greater than 100 mass %, and
   a total mass percentage of the large particle size particle group and small particle size particle group with respect to the mass of the total particles of the plurality of superabsorbent polymer particles is 50 mass % or greater.

2. The excreta treatment sheet for animals according to claim 1,
   comprising a hydrophilic sheet between the top sheet and the second absorbent core,
   wherein the hydrophilic sheet is joined both to the top sheet and to the second absorbent core.

3. The excreta treatment sheet for animals according to claim 2,
   wherein a first adhesive layer is disposed between the top sheet and the hydrophilic sheet and a second adhesive layer is disposed between the hydrophilic sheet and the second absorbent core, and
   the first adhesive layer and the second adhesive layer are disposed so that each arrangement pattern at least partially overlaps in a thickness direction of the excreta treatment sheet for animals.

4. The excreta treatment sheet for animals according to claim 2, wherein the hydrophilic sheet is composed of hydrophilic fibers, and interfiber distance of the hydrophilic fibers of the hydrophilic sheet is less than 150 µm.

5. The excreta treatment sheet for animals according to claim 1, wherein the hydrophilic fibers in the first absorbent core are fluff pulp including a cationic surfactant.

6. The excreta treatment sheet for animals according to claim 1, wherein the absorbent body includes a core wrap sheet covering at least the first absorbent core and the second absorbent core.

* * * * *